United States Patent
Thibodeau

(10) Patent No.: US 10,391,698 B2
(45) Date of Patent: *Aug. 27, 2019

(54) METHOD FOR FORMING A CONTAINER BY MOVING THE HANDLE DURING BLOWING

(71) Applicant: DT Inventions, LLC, Houston, TX (US)

(72) Inventor: James Alfred Thibodeau, Gahanna, OH (US)

(73) Assignee: DT Inventions, Houston, TX (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/294,291

(22) Filed: Oct. 14, 2016

(65) Prior Publication Data

US 2017/0028609 A1  Feb. 2, 2017

Related U.S. Application Data

(63) Continuation of application No. 13/958,110, filed on Aug. 2, 2013, now Pat. No. 9,499,302, which is a (Continued)

(51) Int. Cl.
*B29C 49/06* (2006.01)
*B29B 11/08* (2006.01)
(Continued)

(52) U.S. Cl.
CPC .............. *B29C 49/06* (2013.01); *B29B 11/08* (2013.01); *B29B 11/14* (2013.01); *B29C 49/0073* (2013.01); *B29C 49/12* (2013.01); *B29D 22/00* (2013.01); *B65D 23/10* (2013.01); *B29B 2911/1402* (2013.01); *B29B 2911/1404* (2013.01); *B29B 2911/14026* (2013.01); *B29B 2911/14033* (2013.01); *B29B 2911/1444* (2013.01); *B29B 2911/14106* (2013.01); *B29B 2911/14133* (2013.01); *B29B 2911/14326* (2013.01); *B29B 2911/14333* (2013.01); *B29B 2911/14466* (2013.01);
(Continued)

(58) Field of Classification Search
None
See application file for complete search history.

(56) References Cited

U.S. PATENT DOCUMENTS 9,073,667 B2 * 7/2015 Thibodeau .............. B29B 11/08

* cited by examiner

*Primary Examiner* — Monica A Huson
(74) *Attorney, Agent, or Firm* — Osha Liang LLP

(57) ABSTRACT

A method of forming a container from bi-axially orientable plastics material and having an integral handle with the steps of forming a preform having a neck portion and an expandable portion below the neck portion, with the neck portion including a locating ring above the expandable portion and a handle molded to the non expandable at one end and molded to the expandable portion at the other end. Where the molded-in handle is the approximate length of the handle of the finished container. The unblown preform of orientable plastics is inserted into a blow molder and thereafter stretched by a stretch rod. During the stretch process the handle on the preform unbends rather than stretching to form the approximate shape of the handle in the finished container. The blow mold then closes on the stretched preform thus capturing the handle. Blow gas is then injected into the interior.

9 Claims, 3 Drawing Sheets

Related U.S. Application Data continuation of application No. 12/884,125, filed on Sep. 16, 2010, now Pat. No. 8,524,143.

(60) Provisional application No. 61/242,898, filed on Sep. 16, 2009.

(51) Int. Cl.

| | |
|---|---|
| *B29B 11/14* | (2006.01) |
| *B29C 49/00* | (2006.01) |
| *B29C 49/12* | (2006.01) |
| *B29D 22/00* | (2006.01) |
| *B65D 23/10* | (2006.01) |
| *B29C 49/64* | (2006.01) |
| *B29K 67/00* | (2006.01) |
| *B29K 105/00* | (2006.01) |
| *B29K 105/26* | (2006.01) |
| *B29L 31/46* | (2006.01) |
| *B29L 31/00* | (2006.01) |

(52) U.S. Cl.
CPC . *B29B 2911/14513* (2013.01); *B29C 49/6436* (2013.01); *B29C 2049/1214* (2013.01); *B29K 2067/00* (2013.01); *B29K 2067/003* (2013.01); *B29K 2105/258* (2013.01); *B29K 2105/26* (2013.01); *B29L 2031/463* (2013.01); *B29L 2031/7158* (2013.01); *Y10T 428/1352* (2015.01); *Y10T 428/1397* (2015.01)

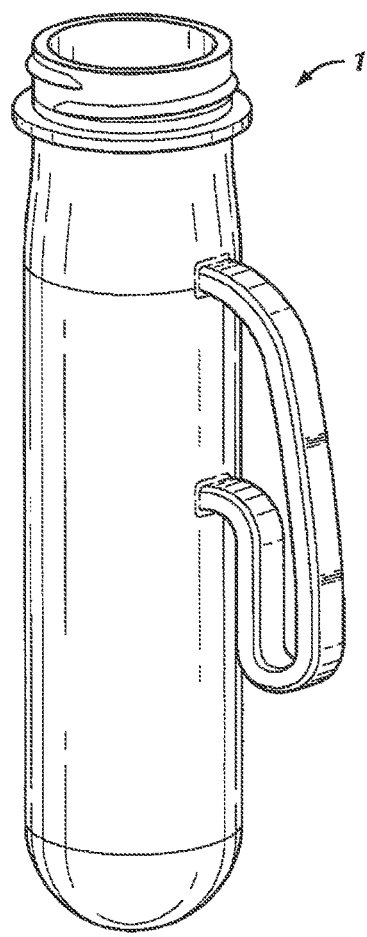 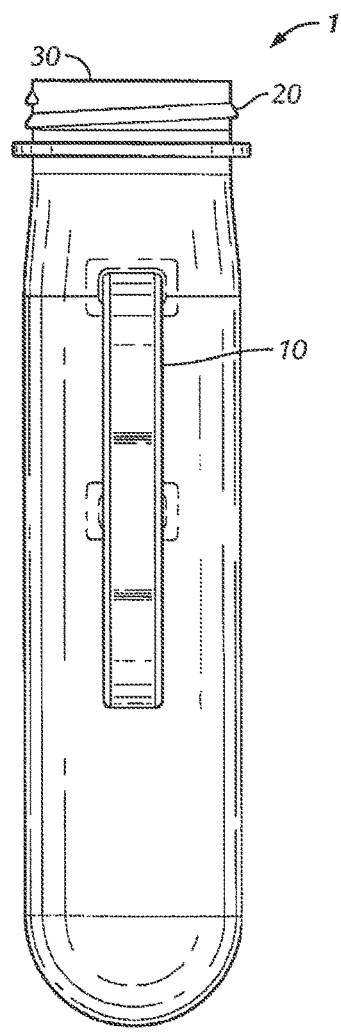
FIG. 1a                    FIG. 1b

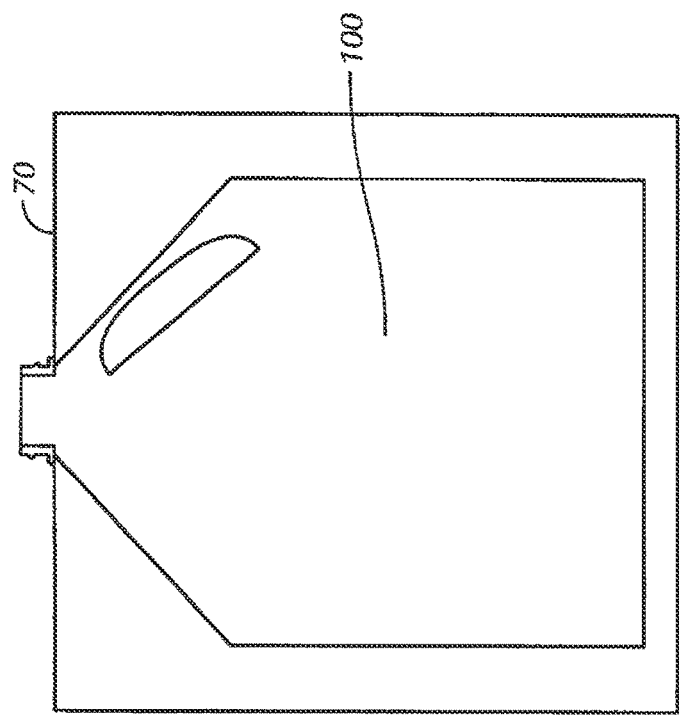
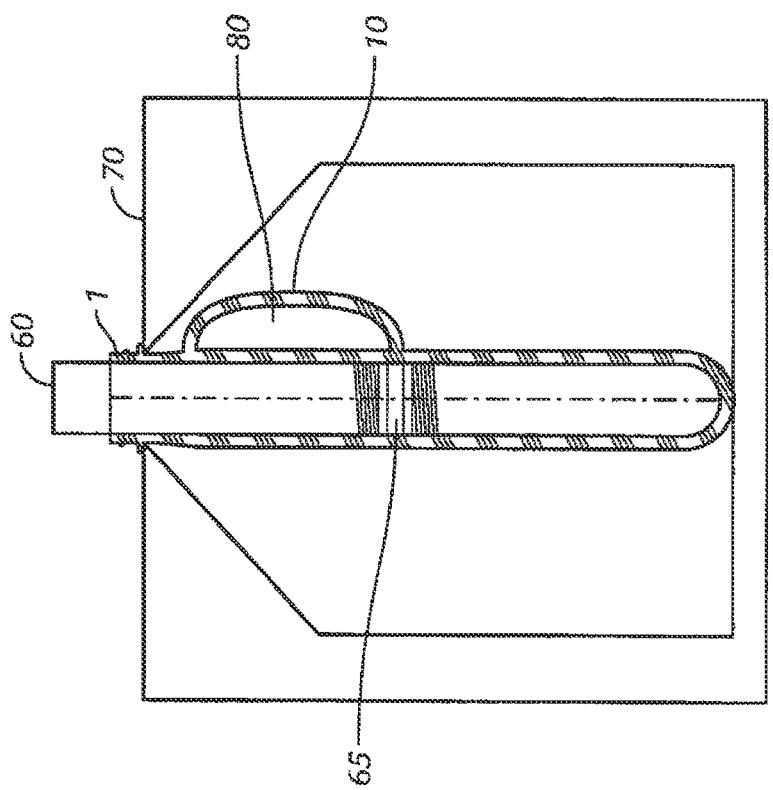
FIG. 2
FIG. 3

METHOD FOR FORMING A CONTAINER BY MOVING THE HANDLE DURING BLOWING

RELATED APPLICATION

This is a non-provisional application claiming the priority date of Provisional Application No. 61/242,898 filed Sep. 16, 2009.

BACKGROUND OF INVENTION

1. Field of Invention

The present invention relates to a method for forming a container from bi-axially orientable plastics material and having an integral handle and in more particular using PET or like thermoplastics material.

2. Description of Prior Art

There is a continuous demand, particularly in the food and beverage industry, for articles, such as bottles, buckets, pitchers, etc., made of clear, tough plastic because they are relatively inexpensive, easy to use, generally non-breakable and serve as good substitutes for glass. It is oftentimes desirable that such articles have handles to as good substitutes for glass. It is oftentimes desirable that such articles have handles to aid in their use, particularly large bottles.

However, it is generally understood that PET lacks sufficient hot melt strength to be extrusion blow molded and it work hardens thereby preventing it from entering shallow areas or forming sharp corners of a mold which form an integral handle. As a result, integrally molded handles on PET bottles have been susceptible to breakage, especially when molded in bottles of larger sizes. The bottle industry has sought an integral-handled PET bottle since PET was first commercially available in 1977. Eastman, DuPont, and other PET resin manufacturers developed a modified PET, called E-PET, that allowed the composition to be extrusion blow molded to form bottles with handles for detergents, milk, etc. However, these bottles were not properly oriented and shattered when drop tested. Also, E-PET was costly and efficiencies in production could not be utilized to reduce the bottles' cost.

Thus, when PET was used and handles were desired, it had been the practice to attach the handle to the PET article in a separate operation, such as by ultrasonic fusion, after the blow molded PET article had been formed in, and removed from, the blow mold. U.S. Pat. No. 4,727,997 discloses a method and apparatus for producing a PET bottle with a PET handle. In a first step, a parison is blow molded in a blow mold which has inwardly extending circumferential ridges to produce a blown bottle with article-encircling grooves therein. In a second step, the blow molded bottle is transferred to a second grip forming mold, which has circumferential grooves therein, and a handle is injection molded onto the bottle.

Another approach has been to injection mold a thermoplastic handle in a separate operation from the blow molding of the container, and then to snap the separately molded handle over the neck or finish of the blown PET bottle. In accordance with a still further proposal, the separately molded handle is inserted into the blow mold and the bottle is blown over, or into, the handle. This rests in a bottle that has a carrying handle or a two handed pour bottle.

Others have previously attempted to overcome the problems associated with forming PET bottles with durable integral handles. U.S. Pat. Nos. 4,992,230, 4,993,931 and 5,057,266 all disclose a method and apparatus for making a hollow blow molded PET article with an integral external projection such as a handle. The method includes blow molding the hollow article and then injection molding the integral projection thereon. The apparatus includes a combination mold having separate and independent blow mold and injection mold cavities which communicate at an interface therebetween. In essence, in the method and apparatus of that invention, a PET preform is inserted into a combination blow mold and injection mold wherein the blow mold cavity defines article (bottle) to be blown and the injection mold cavity defines the handle. The blow mold and injection mold cavities are in communication with each other at a location defining the area where the handle is to extend from the container. After insertion into the blow mold, the preform is injected with blow gas from a gas nozzle to conform the preform to the blow mold cavity thereby forming the hollow blow molded bottle. While the pressure of the blow gas holds the preform in conformity with the blow mold cavity, and prior to exhausting the blow gas, molten PET is injected under pressure into the injection mold cavity to form the integral handle and bond it to the blown preform bottle at the point where the injection mold cavity communicates with the blow mold cavity. The combination mold is then opened and the finished bottle is removed.

Another attempt to solve the handle problem U.S. Pat. No. 6,733,716 whereby a PET bottle is stretch blown and the heated mold parts close on the blown bottle and try to form a handle. With this method material must then be trimmed out causing wasted and decrease production rates.

None of the above practices, however, has been entirely satisfactory in making PET bottles with integral handles since they add steps to the fabrication process, utilize extra materials, and employ complicated molds. Furthermore, other known methods requiring ultrasonic bonding equipment or multiple separate molds are unduly time-consuming, unnecessarily expensive and still do not overcome the handle breakage problem seen in larger bottles or containers.

There is still room for improvement in the art.

SUMMARY OF THE INVENTION

The current invention is a method of forming a container from bi-axially orientable plastics material and having an integral handle with the method of forming a preform having a neck portion and an expandable portion below the neck portion, said neck portion including a locating ring above the expandable portion and a handle molded to the non expandable at one end and molded to the expandle portion at the other end. The molded-in handle is the approximate length of the handle of the finished container. The unblown preform of orientable plastics is inserted into a blow molder and thereafter stretched by a stretch rod. During the stretch process the handle on the preform unbends rather than stretching to form the approximate shape of the handle in the finished container. The blow mold then closes on the stretched preform thus capturing the handle. Blow gas is then injected into the interior of the preform. The blow gas causes the handle portion of mold to move to the shape of the finished container while simultaneously blowing the finished container. After the preform is blown into the shape of the bottle in the mold, blow gas is discharged from the stretch rod.

BRIEF DESCRIPTION OF DRAWINGS

Without restricting the full scope of this invention, the preferred form of this invention is illustrated in the following drawings:

FIG. 1a shows the preform prior to being blown;

FIG. 1b shows a side view of the preform prior to being blown;

FIG. 2 shows a schematic of the preform in the stretched position with an adjustable stretch rod in the blowmold with the moveable handle piece; and FIG. 3 shows a schematic of the blown bottle in the mold with the moveable handle piece shifted to it final position.

DETAILED DESCRIPTION

Figures 1C, 1D:
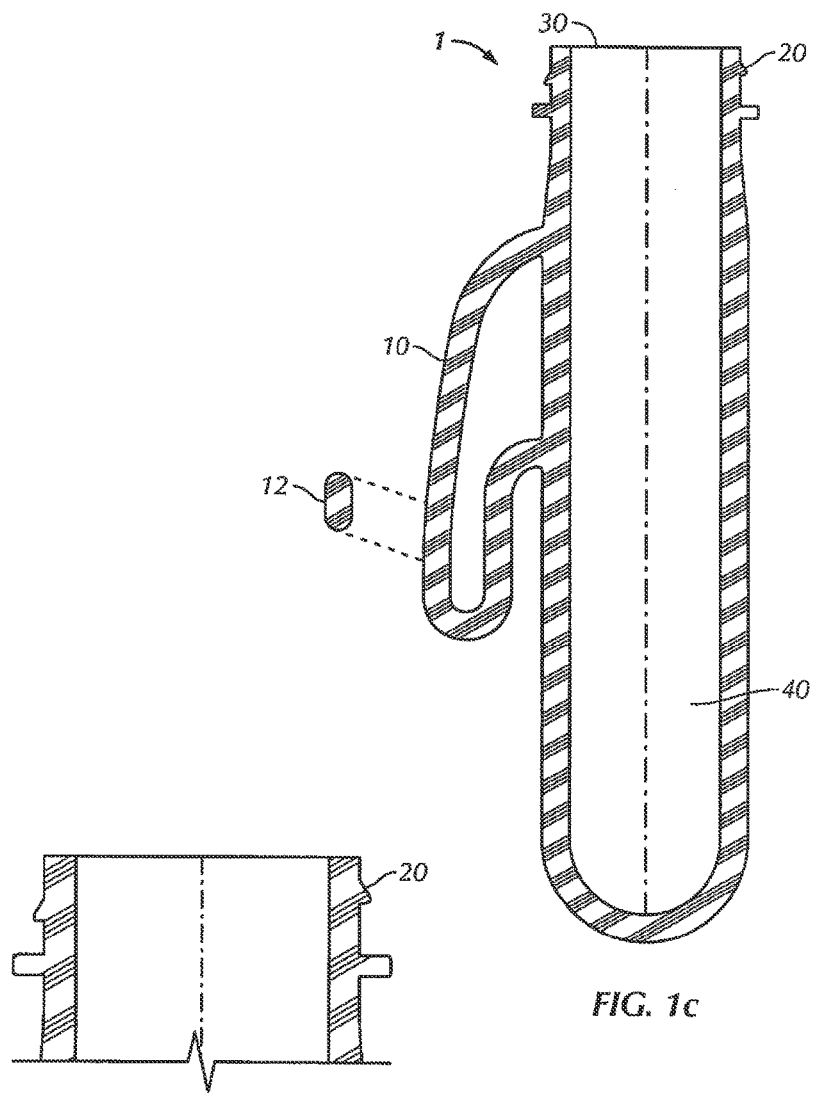
FIG. 1c shows a cross section of the preform prior to being blown.
FIG. 1d shows a cross section of the handle.

The following description is demonstrative in nature and is not intended to limit the scope of the invention or its application of uses.

There are a number of significant design features and improvements incorporated within the invention.

The current invention is a method of forming a container 100 from bi-axially orientable plastics material and having an integral handle 10 with the method of forming from a preform 1.

According to one aspect of the invention, there is provided a preform 1 for a container 100 comprised of orientable thermoplastic material and arranged so that the resultant blown container 100 will include a handle 10 with the preform 1 comprising a molded structure having a neck portion 20 and an expandable portion below the neck as shown in. FIGS. 1a and 1b. The preform 1 will have an opening 30 and cavity 40 as shown in the cross section view of FIG. 1c with a handle cross section 12.

The neck 20 typically includes a locating ring above the expandable portion as shown in a cross section in FIG. 1d. The preform has an integrally molded solid handle attached at 2 points along the vertical axis. The first point of attachment can be either at the non expandable portion of the preform or the expandable portion of the preform. The second point of attachment is at the expandable portion of the preform. The approximate length of the desired handle in the finished container 100 determines the length of the handle. Therefore the shape of the attached handle can be of various geometries to accommodate the desired handle length.

During the blow molding operation the preform 1 is oriented in a manner to provide sufficient heat behind the handle 10 while not overheating the handle 10. On the final station prior to blowing the container 100 the preform 1 is oriented so that the handle 10 is in the proper alignment with mold 70. In a typical injection stretch process the mold 70 would close, the stretch rod 60 would be extended and the blow air would create the container. Unlike typical injection stretch blown processes when the preform 1 arrives at the blowing station the neck 20 of the preform 1 is externally secured. The modified stretch rod 60 is extended causing the preform to stretch.

The modified stretch rod 60 may have an adjustment portion 65 to adjust the size of the rod 60.

When the preform 1 stretches, the attachment points of the handle 10 become separated to the distance of the blown container. The handle 20 itself does not stretch rather uncoils. This causes a sufficient gap between the preform 1 and the handle 20. The mold then closes and the handle 20 is then trapped in the handle pocket 80 of the mold. The handle pocket 80 of the mold 70 is allowed to move to its final location by means of the blow air while the container 100 is blown. The movable mold segments within the blow mold cavity may be unitary segments or may themselves consist of multiple parts. When the mold 70 is opened the handle pocket 80 is retracted resulting in an injection stretch blown container with an integral handle attached at 2 points.

In an alternate version of the preform, the preform handle could be achieved by mechanical means by physically attaching the handle to the preform outside the injection molding process or by coinjecting the handle on the preform.

In an alternate version of the preform, the preform could be molded with a handle that is shorter than the finished handle. The handle 10 itself could be stretched to the desired length with the stretch rod 60.

In an alternate form of this invention utilizing the handled preform 1 the sequence of the injection stretch operations could be modified. When the oriented preform is sequenced into the molding station the molds 70 would close, the stretch rod 60 would be extended. However prior to blowing the container 100, the handle pockets in the mold 70 would extend to capture the handle 20. When the container 180 is blown the handle pocket would be allowed to move to the finished container requirements. The movable mold segments within the blow mold cavity may be unitary segments or may themselves consist of multiple parts.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

What is claimed is:

1. A method for forming a blown container from a preform, comprising:
   placing the preform in a blow mold, the preform comprising:
   an expandable main body having an interior cavity, and
   a handle attached to an exterior wall of the main body at two attachment points; and
   blowing the preform to form the blown container,
   wherein, when placing the preform in the blow mold, the handle is disposed in an initial position, and
   wherein, while blowing the preform, the handle is moved to a final position different from the initial position.

2. The method according to claim 1, wherein, while blowing the preform, the handle is rotated outwards to the final position.

3. The method according to claim 2, wherein the handle is rotated to be at a different angle with respect to the main body at the final position from the initial position.

4. The method according to claim 1, wherein at the final position, an entirety of the handle is at a different position from the initial position.

5. The method according to claim 1, wherein a handle pocket of the blow mold is inserted into the handle.

6. The method according to claim 5, wherein the handle pocket moves while blowing the preform, so as to move the handle from the initial position to the final position.

7. The method according to claim 1, further comprising:
   stretching the preform with a stretch rod prior to blowing the preform.

8. The method according to claim 7,
   wherein the handle comprises a coiled portion, and
   wherein, while stretching the preform with the stretch rod, the coiled portion is uncoiled.

9. The method according to claim 7, further comprising: wherein the stretching the preform is performed within the blow mold.

* * * * *